US012659854B2

(12) United States Patent
Mitra et al.

(10) Patent No.: US 12,659,854 B2
(45) Date of Patent: Jun. 16, 2026

(54) HIERARCHICAL SLEEP MODE MANAGEMENT IN BASE STATIONS

(71) Applicant: Dell Products L.P., Round Rock, TX (US)

(72) Inventors: Jeebak Mitra, Ottawa (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 18/364,438

(22) Filed: Aug. 2, 2023

(65) Prior Publication Data

US 2025/0048253 A1     Feb. 6, 2025

(51) Int. Cl.
    *H04W 24/02*          (2009.01)
    *H04W 52/02*          (2009.01)
(52) U.S. Cl.
    CPC ....... *H04W 52/0206* (2013.01); *H04W 24/02* (2013.01)
(58) Field of Classification Search
    CPC .......................... H04W 24/02; H04W 52/0206
    See application file for complete search history.

(56) References Cited

PUBLICATIONS

International Search Report and Written Opinion mailed May 15, 2024 for PCT Application No. PCT/US2023/036310, 15 pages.

Moderator (Intel Corporation): "Discussion Summary #5 for energy saving techniques of NW energy saving SI", 3GPP Draft; RI-2210744, RAN WGI, e-Meeting; Oct. 2022, [https://ftp.3gpp.org/tsg_ran/WG1_RL1/TSGR1_110b-e/Docs/R1-2210744.zip R1-2210744 FLS_110-NW_Energy_NR-02_final.docx] 488 pages.
Samsung: "Network energy saving techniques", 3GPP Draft; RI-2209743, RAN WGI, e-Meeting; Oct. 2022, [https://ftp.3gpp.org/tsg_ran/WG1_RL1/T SGRI_110b-e/Docs/RI-2209743.zip RI-2209743.docx] 26 pages.
Interdigital: "Time domain NES techniques", 3GPP Draft; R2-2207246, RAN WG2, Online; Aug. 2022; [https://ftp.3gpp.org/tsg_ran/WG2_RL2/T SGR2_119-e/Docs/R2-2207246.zip R2-2207246 (RI8 NES WI AI 8.3.2 NES time domain techniques) .doc] 7 pages.
G. Auer et al., "How much energy is needed to run a wireless network?," IEEE Wirel. Commun., vol. 18, No. 5, pp. 40-49, Oct. 2011, doi: 10.1109/MWC.2011.6056691. 11 pages.

(Continued)

*Primary Examiner* — Gbemileke J Onamuti
(74) *Attorney, Agent, or Firm* — Amin, Turocy & Watson, LLP

(57)                ABSTRACT

A method can comprise determining, by a system, a first sleep mode action for a first group of cellular base station signal metrics for a cellular base station over a first time period, wherein the first group of cellular base station signal metrics is determined based on a first layer of communications of the cellular base station. The method can further comprise determining, by the system, a second sleep mode action for a second group of cellular base station signal metrics for the cellular base station over a second time period. The method can further comprise determining, by the system, an arbitrated sleep mode action based on the first sleep mode action and the second sleep mode action. The method can further comprise sleeping, by the system, at least part of the cellular base station based on the arbitrated sleep mode action.

20 Claims, 10 Drawing Sheets

(56)     References Cited

PUBLICATIONS

D. Lopez-Perez et al., "A Survey on 5G Radio Access Network Energy Efficiency: Massive MIMO, Lean Carrier Design, Sleep Modes, and Machine Learning," arXiv:2101.11246 , Oct. 2021, 107 pages.

J. Liu, B. Krishnamachari, S. Zhou, and Z. Niu, "DeepNap: Data-Driven Base Station Sleeping Operations Through Deep Reinforcement Learning," IEEE Internet of Things Journal, vol. 5, No. 6, Dec. 2018, doi: 10.1109/JIOT.2018.2846694, 10 pages.

International Preliminary Report on Patentability mailed Feb. 12, 2026 for PCT Application No. PCT/US2023/036310, 9 pages.

European Office Action mailed Mar. 10, 2026 for European Patent Application No. 23817242.3, 3 pages.

100

200
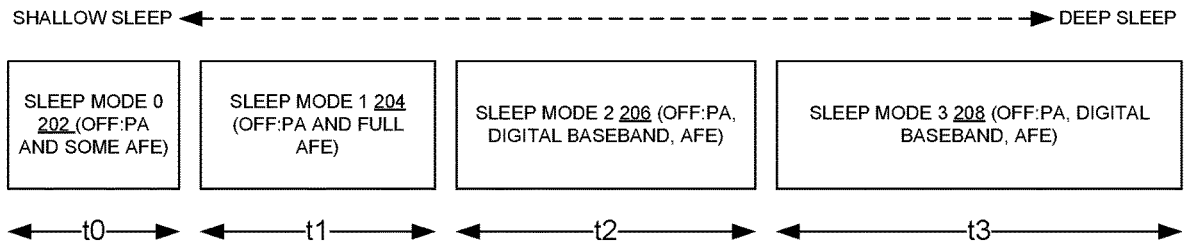
| HIERARCHICAL SLEEP MODE MANAGEMENT IN BASE STATIONS COMPONENT 208 |
| --- |
SHALLOW SLEEP ◄ – – – – – – – – – – – – – – – – – – – – – – – – – – – – – – – – – – – – – ► DEEP SLEEP
| SLEEP MODE 0 202 (OFF:PA AND SOME AFE) | SLEEP MODE 1 204 (OFF:PA AND FULL AFE) | SLEEP MODE 2 206 (OFF:PA, DIGITAL BASEBAND, AFE) | SLEEP MODE 3 208 (OFF:PA, DIGITAL BASEBAND, AFE) |
| --- | --- | --- | --- |
◄——t0——►   ◄——t1——►   ◄——t2——►   ◄——t3——►
FIG. 2

400

```
┌─────────────────────────────────────────────┐
│           TRAFFIC MONITORING 402              │
│  ┌──────────────────┐  ┌──────────────────┐  │
│  │   SHORT-TERM     │  │   LONG-TERM      │  │
│  │   PREDICTION     │  │   PREDICTION     │  │
│  │      404         │  │      406         │  │
│  └──────────────────┘  └──────────────────┘  │
└─────────────────────────────────────────────┘
```

| CSI-REPORT 410 (LINK ADAPTATION) | → | SCHEDULING AND MCS ASSIGNMENT 408 | ← | SYSTEM PARAMETERS 412 (BANDWIDTH, ANTENNA PORTS, MIMO MODE PER ACTIVE USER BASIS, ETC.) |

| BASE STATION POWER CONSUMPTION MODEL 416 | → | LOAD DEPENDENT ENERGY CONSUMPTION COMPUTATION 414 |

SLEEP MODE MANAGEMENT 418

SLEEP MODE DECISIONS 420

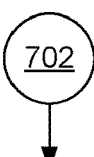

702

DETERMINING A FIRST SLEEP MODE ACTION FOR A FIRST GROUP OF CELLULAR BASE STATION SIGNAL METRICS FOR A CELLULAR BASE STATION OVER A FIRST TIME PERIOD, WHEREIN THE FIRST GROUP OF CELLULAR BASE STATION SIGNAL METRICS IS DETERMINED BASED ON A FIRST LAYER OF COMMUNICATIONS OF THE CELLULAR BASE STATION 704

DETERMINING A SECOND SLEEP MODE ACTION FOR A SECOND GROUP OF CELLULAR BASE STATION SIGNAL METRICS FOR THE CELLULAR BASE STATION OVER A SECOND TIME PERIOD, WHEREIN THE FIRST GROUP OF CELLULAR BASE STATION SIGNAL METRICS DIFFERS FROM THE SECOND GROUP OF CELLULAR BASE STATION SIGNAL METRICS, WHEREIN THE SECOND GROUP OF CELLULAR BASE STATION SIGNAL METRICS IS DETERMINED BASED ON A SECOND LAYER OF COMMUNICATIONS OF THE CELLULAR BASE STATION, AND WHEREIN THE FIRST TIME PERIOD DIFFERS FROM THE SECOND TIME PERIOD 706

DETERMINING AN ARBITRATED SLEEP MODE ACTION BASED ON THE FIRST SLEEP MODE ACTION AND THE SECOND SLEEP MODE ACTION 708

SLEEPING AT LEAST PART OF THE CELLULAR BASE STATION BASED ON THE ARBITRATED SLEEP MODE ACTION 710

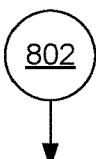

802

DETERMINING A FIRST SLEEP MODE ACTION FOR A FIRST GROUP OF CELLULAR BASE STATION SIGNAL METRICS APPLICABLE TO A CELLULAR BASE STATION WITH RESPECT TO A FIRST TIME PERIOD, WHEREIN THE FIRST GROUP OF CELLULAR BASE STATION SIGNAL METRICS IS DETERMINED BASED ON A FIRST LAYER OF COMMUNICATIONS OF THE CELLULAR BASE STATION 804

DETERMINING A SECOND SLEEP MODE ACTION FOR A SECOND GROUP OF CELLULAR BASE STATION SIGNAL METRICS APPLICABLE TO THE CELLULAR BASE STATION WITH RESPECT TO A SECOND TIME PERIOD, WHEREIN THE SECOND GROUP OF CELLULAR BASE STATION SIGNAL METRICS IS DETERMINED BASED ON A SECOND LAYER OF COMMUNICATIONS OF THE CELLULAR BASE STATION 806

DETERMINING A SELECTED SLEEP MODE ACTION BASED ON THE FIRST SLEEP MODE ACTION AND THE SECOND SLEEP MODE ACTION 808

SLEEPING AT LEAST PART OF THE CELLULAR BASE STATION BASED ON THE SELECTED SLEEP MODE ACTION 810

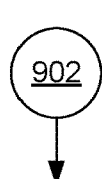

902

DETERMINING RESPECTIVE SLEEP MODE ACTIONS FOR BASE STATION EQUIPMENT BASED ON RESPECTIVE GROUPS OF BASE STATION SIGNAL METRICS FOR THE BASE STATION EQUIPMENT, WHEREIN THE RESPECTIVE GROUPS OF BASE STATION SIGNAL METRICS CORRESPOND TO RESPECTIVE COMMUNICATIONS LAYERS OF THE BASE STATION EQUIPMENT 904

DETERMINING A SLEEP MODE ACTION BASED ON THE RESPECTIVE SLEEP MODE ACTIONS, RESULTING IN A DETERMINED SLEEP MODE ACTION 906

SLEEPING AT LEAST PART OF THE BASE STATION EQUIPMENT BASED ON THE DETERMINED SLEEP MODE ACTION 908

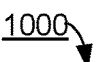
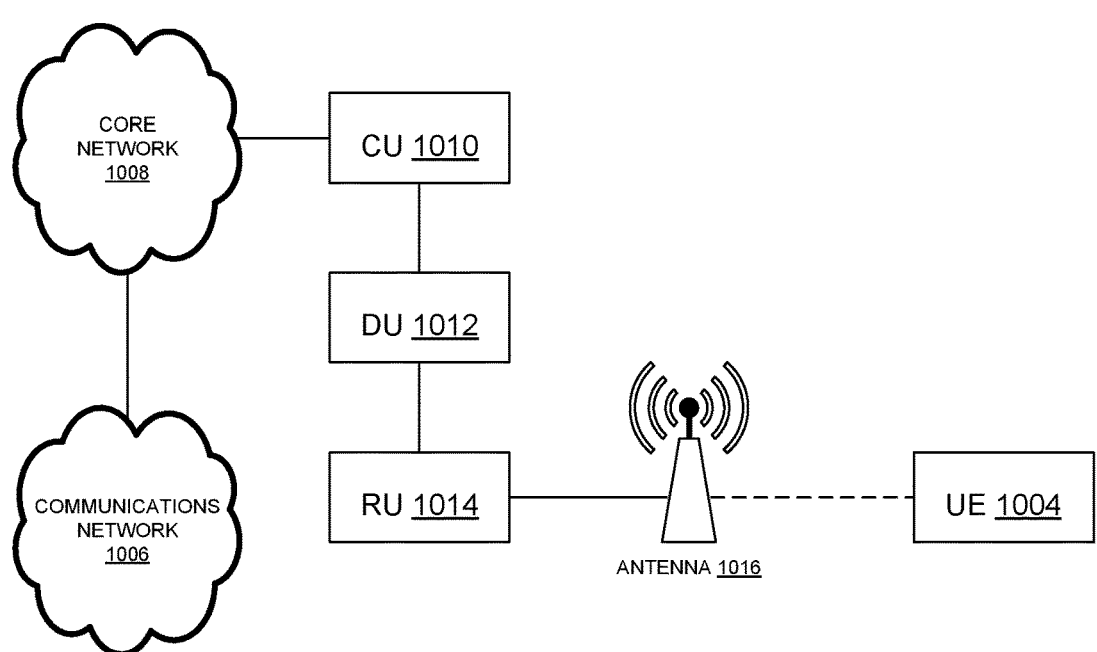
FIG. 10

HIERARCHICAL SLEEP MODE MANAGEMENT IN BASE STATIONS

BACKGROUND

A base station can communicate with user equipment to facilitate mobile communications, or cellular network communications. In doing so, a base station can consume energy.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method can comprise determining, by a system, a first sleep mode action for a first group of cellular base station signal metrics for a cellular base station over a first time period, wherein the first group of cellular base station signal metrics is determined based on a first layer of communications of the cellular base station. The method can further comprise determining, by the system, a second sleep mode action for a second group of cellular base station signal metrics for the cellular base station over a second time period, wherein the first group of cellular base station signal metrics differs from the second group of cellular base station signal metrics, wherein the second group of cellular base station signal metrics is determined based on a second layer of communications of the cellular base station, and wherein the first time period differs from the second time period. The method can further comprise determining, by the system, an arbitrated sleep mode action based on the first sleep mode action and the second sleep mode action. The method can further comprise sleeping, by the system, at least part of the cellular base station based on the arbitrated sleep mode action.

An example system can operate as follows. The system can determine a first sleep mode action for a first group of cellular base station signal metrics applicable to a cellular base station with respect to a first time period, wherein the first group of cellular base station signal metrics is determined based on a first layer of communications of the cellular base station. The system can determine a second sleep mode action for a second group of cellular base station signal metrics applicable to the cellular base station with respect to a second time period, wherein the second group of cellular base station signal metrics is determined based on a second layer of communications of the cellular base station. The system can determine a selected sleep mode action based on the first sleep mode action and the second sleep mode action. The system can sleep at least part of the cellular base station based on the selected sleep mode action.

An example non-transitory computer-readable medium can comprise instructions that, in response to execution, cause a system comprising a processor to perform operations. These operations can comprise determining respective sleep mode actions for base station equipment based on respective groups of base station signal metrics for the base station equipment, wherein the respective groups of base station signal metrics correspond to respective communications layers of the base station equipment. These operations can further comprise determining a sleep mode action based on the respective sleep mode actions, resulting in a determined sleep mode action. These operations can further comprise sleeping at least part of the base station equipment based on the determined sleep mode action.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates example sleep states for base stations based on different durations that can facilitate hierarchical sleep mode management in base stations, in accordance with an embodiment of this disclosure;

FIG. 4 illustrates an example process flow that can facilitate hierarchical sleep mode management in base stations, in accordance with an embodiment of this disclosure;

FIG. 7 illustrates an example process flow that can facilitate hierarchical sleep mode management in base stations, in accordance with an embodiment of this disclosure;

FIG. 8 illustrates another example process flow that can facilitate hierarchical sleep mode management in base stations, in accordance with an embodiment of this disclosure;

FIG. 9 illustrates another example process flow that can facilitate hierarchical sleep mode management in base stations, in accordance with an embodiment of this disclosure;

FIG. 10 illustrates an example block diagram of a computer operable to execute an embodiment of this disclosure.

DETAILED DESCRIPTION

Overview

Figure 1:
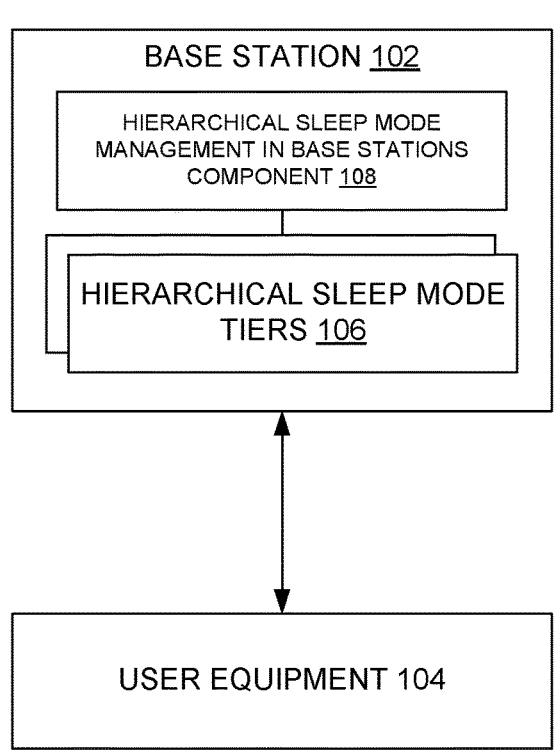
FIG. 1 illustrates an example system architecture that can facilitate hierarchical sleep mode management, in accordance with an embodiment of this disclosure.

Examples described herein can refer to optimizing things, such as base station energy consumption. It can be appreciated that the present techniques can be applied to improving similar metrics, even though the improvement might not be an optimal outcome. Similarly, where examples describe superlatives, such as maximizing a metric, it can be appreciated that there can be examples where an improvement or increase in that metric occurs.

Fifth generation (5G) and beyond 5G (B5G) networks can facilitate features for an end user, including ultra-high speeds, low-latency modes for augmented reality/virtual reality (AR/VR), autonomous driving, connectivity for several hundreds of devices. and significantly lower latency and reliability in some specific modes, relative to prior networks. However, the implementation of such features can also come with a correspondingly high energy consumption cost. Therefore, an energy efficiency of next generation networks can be at a core of a design process, rather than a feature added as an after-thought, in order to meet various climate goals and reduce operational expenses (OPEX) for mobile network operators (MNOs). In some base station examples, a radio access network (RAN) can be responsible for up to 70% of that energy consumption, so it can be a primary target for energy efficiency enhancement. It can be that true energy efficiency enhancement is only possible when there is right combination of data-driven learning of energy efficiency opportunities and their appropriate actuation within RAN components. Contemporary RAN design complexity can make deriving a universal framework for achieving energy efficiency non-trivial, and it can be that, according to the present techniques, a cross-layer effort is used to achieve meaningful energy efficiency enhancements.

With the flexibility of design offered by a 5G new radio (NR) base station design, and an availability of high amounts of data, use of intelligent processing of such data to optimize base station performance as per different key performance indicators (KPIs) to optimize network operations can be systematically streamlined. While mechanisms to avoid higher overhead signaling can be incorporated in the downlink/uplink (DL/UL) frame structures for 5G NR, according to some prior approaches, it can be that these measures alone are not sufficient to have a meaningful impact to reduce overall energy consumption. Traditionally base station architecture, by design, can be configured to handle worst-case traffic scenarios with a heavy load. In practice, however, it can be that these heavy load scenarios are not prevalent at all times, and not for all cell sites of a network deployment. To take advantage of these low usage scenarios, prior approaches can implement sleep states whereby significant portions of a RAN can be powered down to save power. However, in some prior approaches and in previous generations of mobile networks, an approach can be implemented where the cell sites operate in a sleep mode (which can sometimes be referred to as a low-power mode) only when the traffic is low for longer durations, such as nighttime (e.g., between 1 am and 5 am). In other approaches, many smaller sleep cycles can be used to cater to the micro-sleep cycles that are of lesser duration and might not entail powering down full radio frequency (RF)-chains. An intelligent control mechanism can be required to opportunistically take advantage of such lower energy consumption states. Due to flexibility that a 5G protocol design can offer, sleep durations for various power consuming components within a base station can vary from an order of sub-milliseconds to a few hundreds of seconds, which can depend on an activation/de-activation time of various components and the traffic load.

The present techniques can be implemented to facilitate a multi-tier sleep mode management framework as part of the intelligent control mechanism, whereby each tier is configured to be responsive with a different time-granularity to signal statistics that are pertinent to a given time scale of that tier. In some examples, each tier is configured to collect data that is relevant to arrive at an optimal sleep control policy at that tier and run a decision engine that influences a future sleep mode behavior of the base station. In some examples, lower tier sleep control engines can influence the sleep mode behavior of only one engine while, in some examples, one or more tiers provides a recommendation for sleep mode that can be incorporated by a higher tier in its decision making.
Example Architectures FIG. 1 illustrates an example system architecture 100 that can facilitate hierarchical sleep mode management in base stations in accordance with an embodiment of this disclosure. Hierarchical sleep mode management can be a new approach with the present techniques. In it, a hierarchy can emphasize an interaction between layers of base station communications that is absent from prior approaches. It can be that, with prior approaches, interaction between layers of a hierarchy may or not exist for other purposes, but interaction between layers of a hierarchy does not exist for sleep state management.

System architecture 100 comprises base station 102 and user equipment 104. In turn, base station 102 comprises hierarchical sleep mode management tiers 106, and hierarchical sleep mode management in base stations component 108.

Each of base station 102 and/or user equipment 104 can be implemented with part(s) of computing environment 1000 of FIG. 10. Base station 102 can generally comprise one or more antennas and electronic communications equipment to facilitate network communications with user equipment 104. User equipment 104 can generally comprise a computing device used by an end user to communicate with base station 102.

As part of communicating with user equipment 104, base station 102 can consume energy. Base station 102 can reduce, or conserve, an amount of energy it consumes by implementing hierarchical sleep mode management. Hierarchical sleep mode management tiers 106 can comprise multiple tiers that can determine a sleep mode that base station 102 can enter, such as based on different metrics from different communications layers of base station 102, and such as when communicating with user equipment 104 (and other user equipment in communication with base station 102) can be performed at a lower power consumption state (which can sometimes be referred to as a power state) than a current power consumption state. Hierarchical sleep mode management in base stations component 108 can use information from hierarchical sleep mode management tiers 106 to implement a sleep mode for base station 102.

In some examples, communications layers of base station 102 can comprise a radio and physical layer (which can be referred to as Layer 1), Layer 2, and Layer 3. The radio and physical layer can form the actual signal to be transmitted in the electrical domain. In particular, the physical layer can perform the function of encoding, modulation, and waveform generation using digital modules followed by a digital-to-analog convertor (DAC) to feed the modulated analog signal to the radio that can up convert the signal to a correct frequency range and apply adequate gain to the signal to transmit it with a desired signal power using an antenna.

Layer 2 can be an upper layer relative to Layer 1, and comprise a medium access control (MAC) layer and radio link control (RLC) that can schedule the data to be sent to various user equipment as per channel condition, and as per quality of service (QOS) agreements that the different users have.

Layer 3 can be a further higher layer relative to Layer 2, and can control the allocation of resources (radio resource management (RRM)), and control aspects such as admission control, mobility management (handover to another base station), and coordination with other base stations to maintain optimal network operations.

In some examples, hierarchical sleep mode management in base stations component 108 can implement part(s) of the process flows of FIGS. 4 and/or 7-9 to implement hierarchical sleep mode management in base stations.

It can be appreciated that system architecture 100 is one example system architecture for hierarchical sleep mode management in base stations, and that there can be other system architectures that facilitate sleep mode management in base stations.

FIG. 2 illustrates example sleep states 200 for base stations (e.g., a low usage operation) based on different durations that can facilitate hierarchical sleep mode management in base stations, in accordance with an embodiment of this disclosure. In some examples, part(s) of sleep states 200 can be used to implement part(s) of system architecture 100 of FIG. 1 to facilitate hierarchical sleep mode management in base stations.

Sleep states 200 comprises sleep mode 0 202, sleep mode 1 204, sleep mode 2 206, sleep mode 3 208, and hierarchical sleep mode management in base stations component 210 (which can be similar to hierarchical sleep mode management in base stations component 108 of FIG. 1). Sleep mode 0 202 can be performed for an amount of time t0, sleep mode 1 204 can be performed for an amount of time t1, sleep mode 2 206 can be performed for an amount of time t2, and sleep mode 3 208 can be performed for an amount of time t3. It can be that $t0 \leq t1 \leq t2 \leq t3$.

Sleep mode 0 202 can comprise turning off a power amplifier (PA) and some analog front end (AFE). Sleep mode 1 204 can comprise turning off a PA and the full AFE. Sleep mode 2 206 can comprise turning off a PA, a digital baseband, and the AFE. Sleep mode 3 208 can comprise turning off a PA, the digital baseband, and the AFE for a longer amount of time than in sleep mode 2 206.

In order to opportunistically take advantage of quiet periods in downlink (DL)/uplink (UL) transmission, various parts of a radio unit (RU) can be "powered down" to minimize the overall power consumption of the base station. The base station can be put into multiple lower power consumption modes, which can be referred to as "sleep modes," depending on a traffic load and activation/de-activation times of various components. However, it can be that a timescale of such sleep states can be long and limited to leveraging time of day (ToD) and day of week (DoW) patterns with durations that are much longer than a frame duration in 5G NR.

An example of the present techniques can work on the sleep modes as categorized in FIG. 1, whereby sleep mode 0 202 (which can be referred to as SlpMode_0) denotes a mode with a shortest duration (t0) and sleep mode 3 208 (which can be referred to as SlpMode_3) denotes a longest duration (t3), with intermediary durations in between. The particular components that can be put to sleep can depend on the de-activation and activation time for each of the components. For example, in a RF front-end, several components can be analog and hence have capacitive behaviors that have a finite non-zero time that is used to charge/discharge them. For example, for brief durations that last less than a subframe of time, one can shut of a power amplifier (PA) if there is no DL transmission (SlpMode_0).

A problem with prior approaches can relate to a lack of optimal automated dynamic sleep management components. With prior approaches, there can be a lack of mechanisms to optimally activate the particular sleep-state within the base station that can save a maximum amount of energy averaged over a period of operation that takes the base station activity factor explicitly into account. Furthermore, it can be that the activation of sleep state can be considered only at the higher layers of the protocol stack, which can lack a have full visibility into a radio unit's power consumption. Thus, the base station can be unable to take advantages of micro-sleep opportunities as the feedback loop in terms of actuating the sleep state and passing the relevant control information to radio unit, based on the traffic demand received from user equipment (UE) on the uplink, might be too long and need multiple cycles for the policies to be made.

Another problem with prior approaches can relate to a relatively large network response time to low traffic conditions that permit the use of a lower energy consumption state when responded to in an agile manner. Control mechanisms for binary sleep states according to some prior approaches can be too slow to respond to network events that occur at a subframe or frame level, and only respond to time of day, day of week patterns of traffic when they exhibit correlated behavior that spans several tens of minute or hours. This, in turn, can imply that energy saving features that are built-in to a base station are unable to take advantage of the opportunities that have a duration that is relatively lesser than tens of minutes, for example, and in some examples, only follow rule-based shut-off that lasts several hours. The base station can continue to operate in a high power consumption state during these low or no-traffic micro-durations and thus exhibit poor energy efficiency.

Prior approaches in this area can address a macro question of base station being ON/OFF, as in fourth generation long term evolution (4G-LTE)/LTE-Advanced protocols, where the base station needs to be ON continuously for several subframes in order to for UEs to be able to synchronize and for broadcast information. Furthermore, with prior approaches, it can be that energy efficiency was not considered a critical design factor as densification was much lower than the scenarios envisioned for 5G and beyond.

Figure 3:
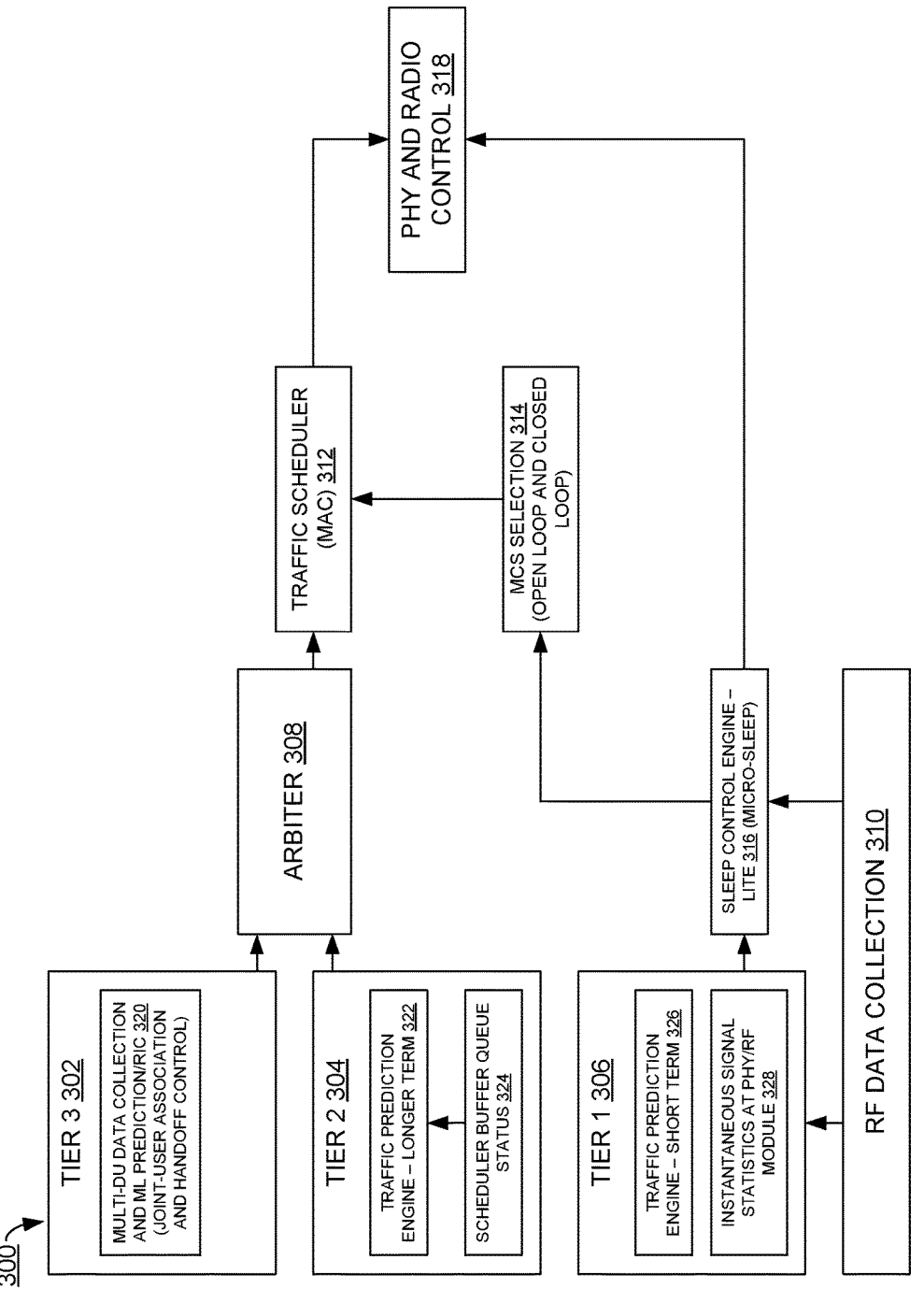
FIG. 3 illustrates an example system architecture for a hierarchical sleep mode management framework that can facilitate hierarchical sleep mode management in base stations, in accordance with an embodiment of this disclosure.

FIG. 3 illustrates an example system architecture 300 for a hierarchical sleep mode management framework that can facilitate hierarchical sleep mode management in base stations, in accordance with an embodiment of this disclosure. In some examples, part(s) of system architecture 300 can be used to implement part(s) of system architecture 100 of FIG. 1 to facilitate hierarchical sleep mode management in base stations.

System architecture 300 comprises tier 3 302, tier 2 304, tier 1 306, arbiter 308, RF data collection 310, traffic scheduler (MAC) 312, MCS selection 314 (open loop and closed loop), sleep control engine—lite 316 (micro-sleep), physical (PHY) and radio control 318, multi-DU data collection and ML prediction/RIC 320 (joint-user association and handoff control), traffic prediction engine—longer term 322, scheduler buffer queue status 324, traffic prediction engine—short term 326, and instantaneous signal statistics at PHY/RF module 328.

According to the present techniques, a sleep prediction can occur at various timescales to opportunistically take advantage of varying traffic loads. In some examples, sleep states can vary from a sub-millisecond level to several seconds to several minutes depending on a statistical pattern being leveraged. Accordingly, a feedback loop for actuating a low power state can need to be small for microsleep strategies compared to relatively longer timescales for hourly patterns for example. Given these considerations, in some examples, a policy engine can be implemented that is able to make sleep mode decisions with varying levels of latency, and be accurate using data-driven decision making. This can be used to facilitate hierarchical sleep mode management as described according to the present techniques. system architecture 300 depicts an example of a hierarchical sleep mode for a base station, with blocks that can aid in pre-processing and actuation of hierarchical sleep mode-based energy efficiency enhancement.

System architecture 300 depicts a multi-tiered sleep control architecture that facilitates hierarchical sleep mode management, where the microsleep states can be governed by instantaneous signal statistics collected from telemetry points in a RU (e.g., tier 1 306). Then, a Tier-2 mechanism (e.g., tier 2 304) can use a long-term traffic prediction, and Tier-3 (e.g., tier 3 302) can look into even longer term and wide area statistics over multiple RUS and distributed units (DUs) considering user association and handoff as viable power strategy strategies for an entire network. System architecture 300 can, accordingly, represent three different tiers that assimilate data at different levels within the base station protocol stack. It can be appreciated that there can be examples that use more or fewer tiers than are depicted in system architecture 300. A level that interacts directly with the wireless channel can be a RF component, and hence can be that a lowest level of data collection happens within the RF component, and can generally comprise raw data that is ingested by the base station from a wireless channel after some basic preprocessing using analog and digital components that can ensure proper signal integrity, and render the signal levels within a useful dynamic range. Traffic prediction can be used to initialize sleep states at a right time. A prediction engine can have varying levels of complexity, in some examples, and at the radio level (labeled as Tier-1) it can be configured to discern signal energy from the aggregate power of subcarriers that over time can help infer a physical resource block (PRB) occupancy percentage, and allows RF control engines to adjust PA output power levels accordingly. A Tier 2 sleep mode engine on the other hand, can reap benefits of scheduler policy knowledge, and in some examples, influence scheduling to prioritize energy efficiency. Finally, Tier-3 can be implemented in an element such as the radio intelligent controller (RIC) that can house several artificial intelligence/machine learning (AI/ML) based control layers for a network.

In some examples, it can be that the policies recommended by each of these tiers are not in perfect agreement, and can have a conflict with the scheduler's own policies (for example, if the scheduler is using some variation of a proportionally fair scheduler). An arbiter can then be put in place (as shown in system architecture 300) to prioritize policy recommendations per KPIs of a network operator.

The present techniques can be implemented to facilitate a hierarchical sleep mode framework. The present techniques can be implemented to facilitate a hierarchical AI/ML engine for sleep mode management that can respond to network events and patterns at all timescales from the millisecond range to hourly patterns including time of day, day of week and geographically isolated events. While some prior approaches have attempted to use binary sleep states that allow a radio unit to either transmit at full power or put it in a dormant state during long periods of relative inactivity, it can be that the success of such approaches has been limited. There can be several reasons for that, such as a lack of data driven policy engines that can (a) determine the optimal power consumption state for the radio unit, and (b) predict the optimal duration for which the radio unit and other RAN elements can be put to sleep to ensure that no KPI service level agreement (SLA) violations occur. A hierarchical sleep mode framework according to the present techniques, and an approach initiated as part of these techniques through a combination of offline training as well as dynamic online learning, can ensure that the network is able to select the appropriate sleep state such that energy consumption can be optimized for various time scales.

Example Process Flow

FIG. 4 illustrates an example process flow 400 that can facilitate hierarchical sleep mode management in base stations, in accordance with an embodiment of this disclosure. In some examples, one or more embodiments of process flow 400 can be implemented by hierarchical sleep mode management in base stations component 108 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 700 of FIG. 7, process flow 800 of FIG. 8, and/or process flow 900 of FIG. 9.

Process flow 400 comprises traffic monitoring 402 (which comprises short-term prediction 404 and long-term prediction 406), scheduling and MCS assignment 408. CSI-report 410 (link adaptation), system parameters 412 (bandwidth, antenna ports, MIMO mode per active user basis, etc.), load dependent energy consumption computation 414, base station power consumption model 416, sleep mode management 418, and sleep mode decisions 420.

The present techniques can be implemented to facilitate dynamic sequential processing within a hierarchical sleep mode. The procedural steps for determining a particular sleep state for an epoch or for a succession of epochs is depicted at a high level in process flow 400. In some examples, there can be certain operational parameters that are fixed when the base station is configured within the network, and can be considered to be relatively static other than cases where the network attributes are significantly reconfigured. These can be referred to as system parameters in process flow 400, and along with the channel state information (CSI)-report that the base station receives from the UEs and the buffer queue status of the various connected UEs, can form the inputs to the scheduler. In some examples, for regular operation, this can form a sufficient data set for scheduling DL transmission (408) for various UEs.

For an energy efficiency-focused scheduling, AI-ML driven traffic forecasting can be leveraged (402, which can comprise short-term prediction 404 and long-term prediction 406). The traffic prediction component can provide an estimate of traffic demand on a subframe basis well in advance, so the scheduler can already have a nominal modulation and coding scheme (MCS) level selected for that subframe in advance. A difference between the predicted scheduling output and the actual output can be determined based on a difference in traffic conditions considered by the AI/ML component compared with the one reported to the base station in real-time. Based on these predictions, the scheduler can therefore pre-determine an energy efficiency state for the base station to be in, as described below. In some examples, the scheduler can choose a MCS level that provides a highest spectral efficiency, while ensuring that block error rate (BLER) targets for the UEs being scheduled are met. Various inputs can be used by the scheduling and MCS assignment block to determine this. For example, a channel quality indicator (CQI) report received from the UE, and in case of time domain duplexing (TDD) bands, the uplink reference signals (pilots) can both be used to establish the correct MCS. However, while prior schedulers can tend to be conservative in terms of MCS allocation in order to use some additional margin in the link budget, energy efficient scheduling can recommend a MCS level that is slightly more aggressive so as to use fewer resources in the time domain (or a greater set of resource elements in the frequency domain). Such actions can create more opportunities for the power consuming RF circuitry to be switched off opportunistically.

Once PRB scheduling is done, a power consumption model (which, in some examples, can be chosen from among multiple possible power consumption models) for the base station can be used to determine energy consumption of the frame, and fed to the sleep mode management component, which can be implemented at layer 2. The scheduling and MCS assignment can already incorporate any recommendations from the RU regarding choices of modulation and RB allocation based on the prediction models.

In some examples, where there are instantaneous deviations in the traffic at real-time, then the sleep mode management can try to determine if a more energy efficient transmission is possible. In a case where sleep mode management does not find a more energy efficient transmission, then sleep mode management can accept one as recommended by scheduling and MCS assignment 408, and can both proceed with the transmission, and can communicate a sleep mode decision to a corresponding RU.

Example Architectures

Figure 5:
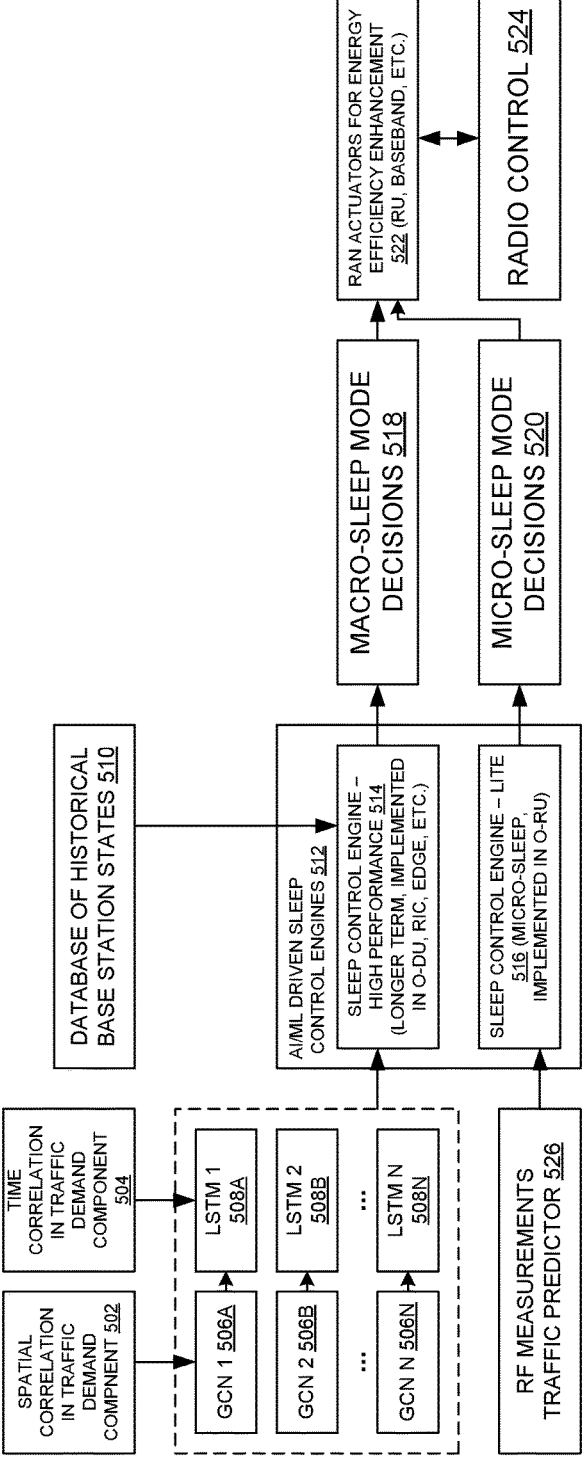
FIG. 5 illustrates an system architecture for a two-tiered sleep control engine that can facilitate hierarchical sleep mode management in base stations, in accordance with an embodiment of this disclosure.

FIG. 5 illustrates a system architecture 500 for a two-tiered sleep control engine that can facilitate hierarchical sleep mode management in base stations, in accordance with an embodiment of this disclosure. In some examples, part(s) of system architecture 500 can be used to implement part(s) of system architecture 100 of FIG. 1 to facilitate hierarchical sleep mode management in base stations.

System architecture 500 comprises spatial correlation in traffic demand component 502, time correlation in traffic demand component 504, an implementation of a graph convolutional network (GCN) 1 506A, GCN 2 506B, GCN N 506N, an implementation of long short-term memory (LSTM) 1 508A, LSTM B 508B, LSTM N 508N, database of historical base station states 510, AI/ML driven sleep control engines 512, sleep control engine—high performance 514 (for determining longer term sleep states, which can be implemented in O-DU, RIC, and/or edge, for example) sleep control engine—lite 516 (for determining micro-sleep states, which can be implemented in O-RU), macro-sleep mode decisions 518, micro-sleep mode decisions 520, RAN actuators for energy efficiency enhancement 522 (RU, baseband, etc.), radio control 524, and RF measurements traffic predictor 526.

The present techniques can be implemented to facilitate deep reinforcement learning for base station sleep mode control. Use of neural network (NN) architectures for reinforcement learning based sleep mode control can be advantageous, as it can have an ability to respond to a changing RF environment and traffic demand matrix. Accordingly, in some examples of the hierarchical sleep mode policy engines, deep reinforcement learning (RL) can be used as an underlying concept with explicit state and action spaces that pertain to network energy efficiency optimization. It can be noted that, in some examples, any two consecutive base station state switching operations can be correlated with each other by definition, and therefore a current base station switching operation can also further influence an overall energy consumption in the long run. However, it can be that analysis-based approaches and greedy algorithms ignore these sequential dependencies among the consecutive base station sleep control decisions almost entirely. Here again, RL according to the present techniques can be a compelling tool to incorporate such sequential dependencies, and as depicted in system architecture 500, a database of historic base station states (with a finite memory) that is maintained by each base station to feed into an optimal policy selection. For large networks, it can be that Q-tables based RL techniques are not be suitable, as they can suffer from the curse of dimensionality. In particular, with a Markovian formulation of the problem, the following aspects can be defined:

1. State Space: The state in this context can comprise traffic demand, current energy consumption, and committed throughput (or other KPIs as prioritized by the network operator). In some examples, to consider a faster training, the traffic load aspect of the state space can be discretized to consider 10%, 20% . . . and so on, up to 100% in steps of 10% (note other discretization step than 10% can be implemented in some examples). This can help reduce a number of combinations that are considered, such that the total combinations do not grow exponentially as multiple cells and carriers are considered. In some examples, an additional component such as an autoencoder can also be used to reduce a dimensionality of the state space.

2. Action Space: This can denote a number of valid actions subject to particular sleep states that can be actuated within the base station and an ability of the base station to respond (activate/de-activate) within the times allocated for each of those sleep state. For example, where the PA can be operated at a lower power consumption state, it can be understood that a powered down PA will not be able to handle a 100% loaded PRB map in a next subframe due to the ramp up time required to go back to full power. Additionally, it can be that the action space should have reasonable cardinality (number of actions to take), as otherwise the number of actions to respond to different traffic conditions can become too small. On the other hand, a larger cardinality can affect a convergence time of the RL training in a negative way.

3. Policy: Both an off-policy or on-policy approach can be used where an agent either progressively learns an optimal value-function/policy to find action values of the optimal policy directly or can follow a set greedy policy or a current policy that is in effect, respectively. For example, in some examples where off-policy approaches are implemented, Q-learning can be used to obtain an optimal policy, and it can be different from a policy that generated the samples. In some examples, this approach can help a network decision engine assimilate new and unforeseen information, and additionally caters to a case where training data is insufficient.

4. Reward Function: A reward for an RL agent's actions can have a negative value if that action leads to either (a) a particular network KPI or any weighted combination of the desired KPIs such as the network throughput, latency and blocking probability not being satisfied, and (b) an overall increase in energy consumption compared to a base station long term average trend value for energy consumption. As a secondary requirement, a latency threshold being exceeded can lead to a negative value of lower magnitude for guaranteed bit rate (GBR) traffic, but be non-consequential when non-GBR traffic classes are being considered. Positive reward values can be set for introducing sleep states, and the longer the sleep state identified while satisfying KPI constraints, greater the reward value. In some examples, a reward value can be normalized between +1 and −1.

With a high-level architecture for hierarchical sleep mode as described above, several derivate examples can be envisioned that can be able to make use of data that is available at various levels of a protocol stack.

The present techniques can be implemented to facilitate a tiered sleep control engine for an open RAN (O-RAN) base station. As an example of the hierarchical sleep mode framework, system architecture 500 depicts a high-level architecture that employs a 2-tier deployment of a hierarchical sleep mode concept. In this example, a lower tier resides within the O-RU and a higher tier resides within the O-DU, or an edge server.

This two-tiered structure can flow from a disparate granularity of the time scales to which each of the sleep control engines (SCE) respond to, and also respective inputs they take to make this decision.

Figure 6:
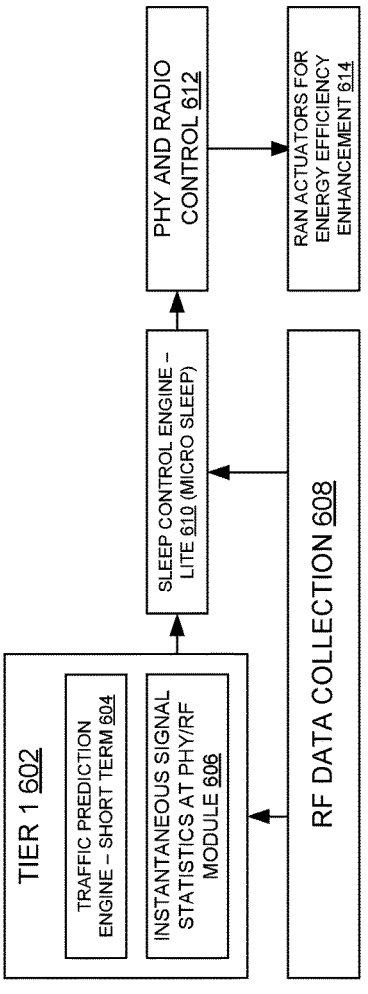
FIG. 6 illustrates an example system architecture for a radio autonomous mode for sleep control without upper layer interaction, in accordance with an embodiment of this disclosure.

FIG. 6 illustrates an example system architecture 600 for a radio autonomous mode for sleep control without upper layer interaction, in accordance with an embodiment of this disclosure. In some examples, part(s) of system architecture 600 can be used to implement part(s) of system architecture 100 of FIG. 1 to facilitate hierarchical sleep mode management in base stations.

System architecture 600 comprises tier 1 602, traffic prediction engine-short term 604, instantaneous signal statistics at PHY/RF module 606, RF data collection 608, sleep control engine-lite 610 (micro sleep), PHY and radio control 612, RAN actuators for energy efficiency enhancement 614.

The present techniques can be implemented to facilitate a radio autonomous mode for sleep mode management. A benefit of O-RAN based implementations can be that standardized messaging across open interfaces between O-DU and O-RU using open fronthaul (Open FH) control user synchronization (CUS)-plane and management (M)-plane can allow for an O-DU from a variety of sources to be deployed with O-RU from a different source.

System architecture 600 depicts an autonomous mode of operation for a hierarchical sleep mode hosted on the RU, whereby the RU only exercises the sleep mode control engine functionality that is captured within the sleep control engine-lite component of system architecture 500 of FIG. 5. This example can reduce a hierarchical sleep mode framework to potentially a single layer such that a radio unit can implement it independently of higher layers to initiate and wake-up from a sleep mode in an autonomous fashion. More specifically, in this mode the O-RU can be unable to independently influence scheduling and MCS assignment, so the intent can be to capitalize on radio control in an independent fashion while considering the RF front-end abilities to control the PA bias, the pre-driver gain and to anticipate the time epochs during which the components in the RF front-ends can be put to sleep. Accordingly, a shallow NN model can be used for traffic prediction based on power measurement on a per sub-carrier basis. In some examples, such a prediction can be made much more accurate where the modulation information is available in a transparent manner to the RU on a per sub-carrier basis. Prior approaches can involve the RU only receiving in-phase quadrature (I/Q) information on a per subframe basis from the DU.

A distinction can be made in this example that the duration of sleep can be limited by an amount of advanced notice that the RU has in terms of DL data transmission. For example, a MAC scheduler can schedule DL data 3 subframes ahead of its physical transmission time. Where a notification is sent to RU instantaneously as well, then a RU component that can be woken up within approximately 2 5G NR subframes can be safely powered down without incurring any degradation on the KPIs.

Example Process Flows

FIG. 7 illustrates an example process flow 700 that can facilitate hierarchical sleep mode management in base stations, in accordance with an embodiment of this disclosure. In some examples, one or more embodiments of process flow 700 can be implemented by hierarchical sleep mode management in base stations component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 800 of FIG. 8, and/or process flow 900 of FIG. 9.

Process flow 700 begins with 702, and moves to operation 704.

Operation 704 depicts determining a first sleep mode action for a first group of cellular base station signal metrics for a cellular base station over a first time period, wherein the first group of cellular base station signal metrics is determined based on a first layer of communications of the cellular base station. This can comprise one tier making a sleep mode prediction for a base station using some set of statistics for a first time period.

In some examples, the first group of cellular base station signal metrics comprises instantaneous radio frequency signal metrics of the cellular base station. This can be similar to instantaneous signal statistics at PHY/RF module 328 of FIG. 3.

In some examples, the first sleep mode action comprises modifying a modulation and coding scheme of the cellular base station. This can be similar to MCS selection 314 of FIG. 3.

In some examples, the first sleep mode action comprises modifying a physical layer and radio control of the cellular base station independently of modifying a modulation and coding scheme of the cellular base station. This can be similar to PHY and radio control 318 of FIG. 3, where it is reached from sleep control engine-lite 316, bypassing MCS selection 314.

After operation 704, process flow 700 moves to operation 706.

Operation 706 depicts determining a second sleep mode action for a second group of cellular base station signal metrics for the cellular base station over a second time period, wherein the first group of cellular base station signal metrics differs from the second group of cellular base station signal metrics, wherein the second group of cellular base station signal metrics is determined based on a second layer of communications of the cellular base station, and wherein the first time period differs from the second time period. This can comprise making another sleep mode prediction—relative to operation 704—for the base station using another set of statistics for a first time period. In some examples, different tiers of the sleep mode management can use statistics from different communications layers.

For example, one layer can be a physical layer. Another layer can include MAC, radio link control (RLC), and a packet data convergence protocol (PDCP). And a third layer can comprise radio resource control (RRC).

In some examples, the second group of cellular base station signal metrics comprises a scheduler buffer queue status of the cellular base station, and the first group of cellular base station signal metrics. Using the example of FIG. 3, the schedule buffer queue status can be similar to scheduler buffer queue status 324, and tier 2 304 can use that information in conjunction with a result from tier 1 306.

In some examples, the second group of cellular base station signal metrics comprises statistics of multiple distributed units of a disaggregated cellular base station (where some prior approaches can utilize a monolithic base station). In some examples, determining the second sleep mode action comprises performing machine learning or artificial intelligence-driven learning on the statistics of multiple distributed units of the disaggregated cellular base station. In some examples, the second group of cellular base station signal metrics comprises user association and handoff control metrics. Using the example of FIG. 3, this can be similar to multi-DU data collection and ML prediction/RIC 320.

After operation 706, process flow 700 moves to operation 708.

Operation 708 depicts determining an arbitrated sleep mode action based on the first sleep mode action and the second sleep mode action. This can comprise picking one of the two sleep modes, and/or combining the sleep modes. In some examples, this can be performed by arbiter 308 of FIG. 3. In other examples, this can comprise traffic scheduler 312 synthesizing, combining, or selecting from a sleep mode from tier 1 306 and another sleep mode from tier 3 302 and/or tier 2 304.

After operation 708, process flow 700 moves to operation 710.

Operation 710 depicts sleeping at least part of the cellular base station based on the arbitrated sleep mode action. This can comprise engaging PHY and radio control 318 of FIG. 3 to, for example, engage an actuator to turn off at least part of a PA.

After operation 710, process flow 700 moves to 712, where process flow 700 ends.

FIG. 8 illustrates an example process flow 800 that can facilitate hierarchical sleep mode management in base stations, in accordance with an embodiment of this disclosure. In some examples, one or more embodiments of process flow 800 can be implemented by hierarchical sleep mode management in base stations component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 700 of FIG. 7, and/or process flow 900 of FIG. 9.

Process flow 800 begins with 802, and moves to operation 804.

Operation 804 depicts determining a first sleep mode action for a first group of cellular base station signal metrics applicable to a cellular base station with respect to a first time period, wherein the first group of cellular base station signal metrics is determined based on a first layer of communications of the cellular base station. In some examples, operation 804 can be implemented in a similar manner as operation 704 of FIG. 7.

After operation 804, process flow 800 moves to operation 806.

Operation 806 depicts determining a second sleep mode action for a second group of cellular base station signal metrics applicable to the cellular base station with respect to a second time period, wherein the second group of cellular base station signal metrics is determined based on a second layer of communications of the cellular base station. In some examples, operation 806 can be implemented in a similar manner as operation 706 of FIG. 7.

In some examples, the second group of cellular base station signal metrics comprises spatial correlation in traffic demand metrics, and determining the second sleep mode action comprises processing the spatial correlation in traffic demand metrics using a graph convolution network. This can be similar to spatial correlation in traffic demand 502 of FIG. 5, which can feed into GCN 1 506A (etc.).

In some examples, the second group of cellular base station signal metrics comprises time correlation in traffic demand metrics, and determining the second sleep mode action comprises: processing the time correlation in traffic demand metrics with a long short-term memory artificial neural network. This can be similar to time correlation in traffic demand 504 of FIG. 5, which can feed into LSTM 1 508A (etc.).

In some examples, determining the second sleep mode action is based on historical operational states of the cellular base station. This can be similar to database of historical base station states 510 of FIG. 5.

In some examples, sleeping at least part of the cellular base station based on the selected sleep mode action comprises engaging an actuator of the cellular base station. This can be similar to RAN actuators for energy efficiency enhancement 522 of FIG. 5.

In some examples, the first time period is shorter than the second time period, and wherein determining the second sleep mode action is based on the first sleep mode action. That is, in some examples, a tier can provide a recommendation for a sleep mode that is incorporated by a higher tier in that higher tier's decision making.

After operation 806, process flow 800 moves to operation 808.

Operation 808 depicts determining a selected sleep mode action based on the first sleep mode action and the second sleep mode action. In some examples, operation 808 can be implemented in a similar manner as operation 708 of FIG. 7.

After operation 808, process flow 800 moves to operation 810.

Operation 810 depicts sleeping at least part of the cellular base station based on the selected sleep mode action. In some examples, operation 810 can be implemented in a similar manner as operation 710 of FIG. 7.

After operation 810, process flow 800 moves to 812, where process flow 800 ends.

FIG. 9 illustrates an example process flow 900 that can facilitate hierarchical sleep mode management in base stations, in accordance with an embodiment of this disclosure. In some examples, one or more embodiments of process flow 900 can be implemented by hierarchical sleep mode management in base stations component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 800 of FIG. 8, and/or process flow 900 of FIG. 9.

Process flow 900 begins with 902, and moves to operation 904.

Operation 904 depicts determining respective sleep mode actions for base station equipment based on respective groups of base station signal metrics for the base station equipment, wherein the respective groups of base station signal metrics correspond to respective communications layers of the base station equipment. In some examples, operation 904 can be implemented in a similar manner as operations 704-706 of FIG. 7.

After operation 904, process flow 900 moves to operation 906.

Operation 906 depicts determining a sleep mode action based on the respective sleep mode actions, resulting in a determined sleep mode action. In some examples, operation 906 can be implemented in a similar manner as operation 708 of FIG. 7.

In some examples, a first time period of the respective time periods is shorter than a second time period of the respective time periods, wherein a first sleep mode action of the respective sleep mode actions that is associated with the first time period comprises turning off a power amplifier of the base station equipment and at least part of an analog portion of the base station equipment, and wherein a second sleep mode action of the respective sleep mode actions that is associated with the second time period comprises turning off the power amplifier and an entirety of the analog portion of a RF frontend. This can be similar to sleep mode 0 202 and sleep mode 1 204 of FIG. 2.

In some examples, a first time period of the respective time periods is shorter than a second time period of the respective time periods, wherein a first sleep mode action of the respective sleep mode actions that is associated with the first time period is determined by a radio hardware unit of the base station equipment, and wherein a second sleep mode action of the respective sleep mode actions that is associated with the second time period is determined by at least one of a distributed unit of the base station equipment, a radio access network intelligent controller, or an edge device. This can be similar to sleep control engine—lite 516 of FIG. 5 for the first sleep mode action, and sleep control engine—high performance 514 for the second sleep mode action.

In some examples, a first sleep mode action of the respective sleep mode actions is determined based on at least one of a bandwidth of the base station equipment, a number of antenna ports of the base station equipment, or multiple-input and multiple-output mode per active user equipment of the base station equipment. This can be similar to system parameters 412 of FIG. 4.

In some examples, a first time period of the respective time periods is shorter than a second time period of the respective time periods, a first sleep mode action of the respective sleep mode actions that is associated with the first time period is based on a first prediction regarding network traffic by the base station equipment, a second sleep mode action of the respective sleep mode actions that is associated with the second time period is based on a second prediction regarding network traffic by the base station equipment, and a third amount of time associated with the first prediction regarding network traffic by the base station equipment is less than a fourth amount of time associated with the first prediction regarding network traffic by the base station equipment. This can be similar to traffic monitoring 402, with short-term prediction 404 corresponding to a prediction for a shorter time period than long-term prediction 406.

In some examples, a radio unit autonomous mode of the base station is configured to determine a first sleep mode action of the sleep mode actions and implement the first sleep mode action independently of a component that is configured to determine a second sleep mode action of the sleep mode actions.

After operation 906, process flow 900 moves to operation 908.

Operation 908 depicts sleeping at least part of the base station equipment based on the determined sleep mode action. In some examples, operation 908 can be implemented in a similar manner as operation 708 of FIG. 7.

After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of base station 102 and/or user equipment 104 of FIG. 1.

In some examples, computing environment 1000 can implement one or more embodiments of the process flows of FIGS. 4 and/or 7-9 to facilitate hierarchical sleep mode management in base stations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

FIG. 10 illustrates an example block diagram 1000 of a computer operable to execute an embodiment of this disclosure. UE 1004 can generally comprise a device used by an end user to access a communications network. UE 1004 can be configured to receive messages from communications network 1006, which can be, for instance, a global communications network such as the Internet.

Messages sent from UE 1004 can be received and processed by core network 1008, which can comprise components of a third generation (3G), fourth generation (4G), long term evolution (LTE), 5G, or other, wireless communication network. Core network 1008 can be configured to establish connectivity between UE 1004 and communications network 1006, such as through facilitating services such as connectivity and mobility management, authentication and authorization, subscriber data management, and policy management. Messages sent between UE 1004 and communications network 1006 can propagate through centralized unit (CU) 1010, distributed unit (DU) 1012, RU 1014, and antenna 1016.

CU 1010 can be configured to process non-real-time RRC and PDCP communications. DU 1012 can be configured to process communications transmitted according to RLC, MAC, and PHY layers. RU 1014 can be configured to convert radio signals sent to antenna 1016 from digital packets to radio signals, and convert radio signals received from antenna 1016 from radio signals to digital packets. Antenna 1016 (which can comprise a transceiver) can be configured to send and receive radio waves that are used to convey information.

CONCLUSION

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, optical disk storage, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server." "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
determining, by a system, a first sleep mode action for a first group of cellular base station signal metrics for a cellular base station over a first time period, wherein the first group of cellular base station signal metrics is determined based on a first layer of communications of the cellular base station;
determining, by the system, a second sleep mode action for a second group of cellular base station signal metrics for the cellular base station over a second time period, wherein the first group of cellular base station signal metrics differs from the second group of cellular base station signal metrics, wherein the second group of cellular base station signal metrics is determined based on a second layer of communications of the cellular base station, and wherein the first time period differs from the second time period;
determining, by the system, an arbitrated sleep mode action based on the first sleep mode action and the second sleep mode action; and
sleeping, by the system, at least part of the cellular base station based on the arbitrated sleep mode action.

2. The method of claim 1, wherein the first group of cellular base station signal metrics comprises instantaneous radio frequency signal metrics of the cellular base station.

3. The method of claim 2, wherein the first sleep mode action comprises modifying a modulation and coding scheme of the cellular base station.

4. The method of claim 2, wherein the first sleep mode action comprises modifying a physical layer and radio control of the cellular base station independently of modifying a modulation and coding scheme of the cellular base station.

5. The method of claim 1, wherein the second group of cellular base station signal metrics comprises a scheduler buffer queue status of the cellular base station, and the first group of cellular base station signal metrics.

6. The method of claim 1, wherein the second group of cellular base station signal metrics comprises statistics of multiple distributed units of the cellular base station.

7. The method of claim 6, wherein determining the second sleep mode action comprises:
performing machine learning or artificial intelligence-driven learning on the statistics of multiple distributed units of the cellular base station.

8. The method of claim 1, wherein the second group of cellular base station signal metrics comprises user association and handoff control metrics.

9. A system, comprising:
a processor; and
a memory coupled to the processor, comprising instructions that, in response to execution by the processor, cause the system to perform operations, comprising:
determining a first sleep mode action for a first group of cellular base station signal metrics applicable to a cellular base station with respect to a first time period, wherein the first group of cellular base station signal metrics is determined based on a first layer of communications of the cellular base station;
determining a second sleep mode action for a second group of cellular base station signal metrics applicable to the cellular base station with respect to a second time period, wherein the second group of cellular base station signal metrics is determined based on a second layer of communications of the cellular base station;
determining a selected sleep mode action based on the first sleep mode action and the second sleep mode action; and
sleeping at least part of the cellular base station based on the selected sleep mode action.

10. The system of claim 9, wherein the second group of cellular base station signal metrics comprises spatial correlation in traffic demand metrics, and wherein determining the second sleep mode action comprises:
processing the spatial correlation in traffic demand metrics using a graph convolution network.

11. The system of claim 10, wherein the second group of cellular base station signal metrics comprises time correlation in traffic demand metrics, and wherein determining the second sleep mode action comprises:
processing the time correlation in traffic demand metrics with a long short-term memory artificial neural network.

12. The system of claim 11, wherein determining the second sleep mode action is based on historical operational states of the cellular base station.

13. The system of claim 9, wherein sleeping at least part of the cellular base station based on the selected sleep mode action comprises:
engaging an actuator of the cellular base station.

14. The system of claim 9, wherein the first time period is shorter than the second time period, and wherein determining the second sleep mode action is based on the first sleep mode action.

15. A non-transitory computer-readable medium comprising instructions that, in response to execution, cause a system comprising a processor to perform operations, comprising:

determining respective sleep mode actions for base station equipment based on respective groups of base station signal metrics for the base station equipment, wherein the respective groups of base station signal metrics correspond to respective communications layers of the base station equipment;

determining a sleep mode action based on the respective sleep mode actions, resulting in a determined sleep mode action; and sleeping at least part of the base station equipment based on the determined sleep mode action.

16. The non-transitory computer-readable medium of claim 15, wherein a first time period of the respective time periods is shorter than a second time period of the respective time periods, wherein a first sleep mode action of the respective sleep mode actions that is associated with the first time period comprises turning off a power amplifier of the base station equipment and at least part of an analog portion of the base station equipment, and wherein a second sleep mode action of the respective sleep mode actions that is associated with the second time period comprises turning off the power amplifier and an entirety of the analog portion of a radio frequency frontend.

17. The non-transitory computer-readable medium of claim 15, wherein a first time period of the respective time periods is shorter than a second time period of the respective time periods, wherein a first sleep mode action of the respective sleep mode actions that is associated with the first time period is determined by a radio hardware unit of the base station equipment, and wherein a second sleep mode action of the respective sleep mode actions that is associated with the second time period is determined by at least one of a distributed unit of the base station equipment, a radio access network intelligent controller of the base station equipment, or an edge device of the base station equipment.

18. The non-transitory computer-readable medium of claim 15, wherein a first sleep mode action of the respective sleep mode actions is determined based on at least one of a bandwidth of the base station equipment, a number of antenna ports of the base station equipment, or multiple-input and multiple-output mode per active user equipment of the base station equipment.

19. The non-transitory computer-readable medium of claim 15, wherein a first time period of the respective time periods is shorter than a second time period of the respective time periods, wherein a first sleep mode action of the respective sleep mode actions that is associated with the first time period is based on a first prediction regarding network traffic by the base station equipment, wherein a second sleep mode action of the respective sleep mode actions that is associated with the second time period is based on a second prediction regarding network traffic by the base station equipment, and wherein a third amount of time associated with the first prediction regarding network traffic by the base station equipment is less than a fourth amount of time associated with the first prediction regarding network traffic by the base station equipment.

20. The non-transitory computer-readable medium of claim 15, wherein a radio unit autonomous mode of the base station is configured to determine a first sleep mode action of the sleep mode actions and implement the first sleep mode action independently of a component that is configured to determine a second sleep mode action of the sleep mode actions.

* * * * *